June 11, 1940.  S. J. NORDSTROM  2,204,440
VALVE
Filed March 16, 1939  4 Sheets-Sheet 1
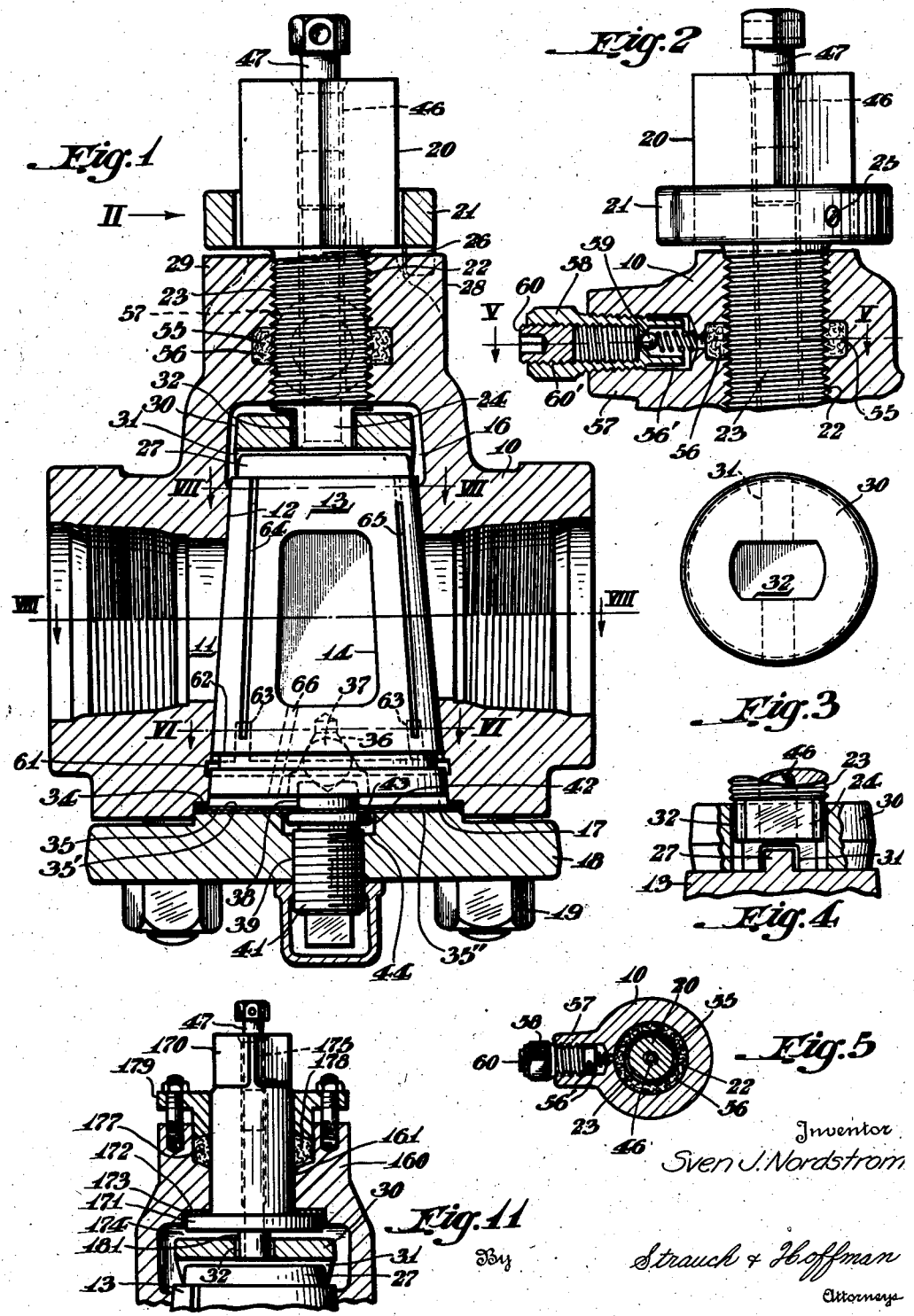
Inventor
Sven J. Nordstrom
By Strauch & Hoffman
Attorneys June 11, 1940. S. J. NORDSTROM 2,204,440
VALVE
Filed March 16, 1939 4 Sheets-Sheet 2

Inventor
Sven J. Nordstrom.

By Strauch & Hoffman
Attorneys

June 11, 1940.  S. J. NORDSTROM  2,204,440
VALVE
Filed March 16, 1939  4 Sheets-Sheet 3
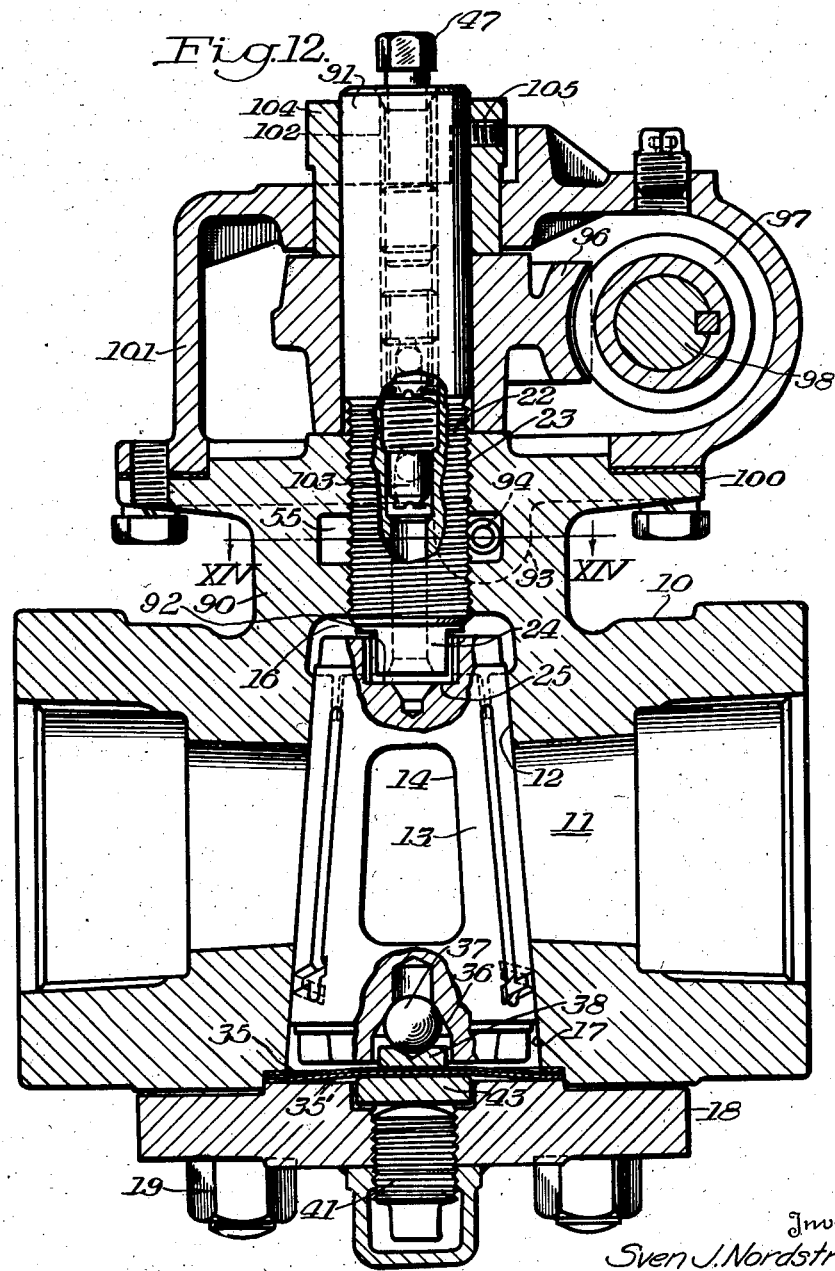
Inventor
Sven J. Nordstrom.
By Strauch & Hoffman
Attorneys June 11, 1940. S. J. NORDSTROM 2,204,440
VALVE
Filed March 16, 1939 4 Sheets-Sheet 4

Inventor
Sven J. Nordstrom
By Strauch & Hoffman
Attorneys

Patented June 11, 1940

2,204,440

UNITED STATES PATENT OFFICE 2,204,440

VALVE

Sven J. Nordstrom, Lafayette, Calif., assignor to Merco Nordstrom Valve Company, Pittsburgh, Pa., a corporation of Delaware Application March 16, 1939, Serial No. 262,299

8 Claims. (Cl. 251—103)

The present invention relates to improvements in valves particularly useful in high pressure service, and is specifically directed to improved means for operating such valves and sealing the operating means against leakage. The invention preferably is employed in lubricated plug valves in combination with lubricant pressure means for unseating or jacking the plug from its seat to free it for rotation. The present invention is an improvement over the inventions shown in my Patents Nos. Re. 17,808 and 1,781,821, and this application is a continuation in part of my copending applications Serial No. 35,848, filed August 12, 1935, and Serial No. 691,213, filed September 27, 1933, now Patent 2,177,873, granted October 31, 1939, which latter application is a continuation-in-part of my application Serial No. 488,253, which has issued as Patent No. 1,932,322, granted October 24, 1933.

In valves in general use, the operating joint between the valve operating shank or spindle and the valve body or casing is commonly sealed by fibrous or similar packing material. The use of this type of packing around the stem increases the resistance to turning of the valve and requires frequent adjustment to prevent leakage to the exterior from the line. In the lubricated type of plug valve disclosed in my Patent No. 1,781,821, the plug is resiliently urged into its seat by fibrous or similar packing material and the operating joint between the plug operating shank or spindle and the valve body or casing is sealed by this packing. In this construction, each time the packing is adjusted to prevent leakage past the stem the resilient pressure exerted on the plug for seating the same likewise is varied, and therefore the pressure exerted on the plug is difficult to adjust to the preferred extent for proper leak-free operation of the valve.

In my Reissue Patent No. 17,808 I have shown a construction of plug valve in which a threaded operating stem separate from the valve plug forms a threaded engagement with the casing, the threaded connection being sealed by lubricant. This construction can be manufactured at reasonable cost for low pressure service, but requires more accurate machining of the threads for high pressure service, thereby increasing the cost of manufacture. Also, at the high pressure of the fluid passing through the valve, lubrication of the threaded connection between the stem and casing becomes more important because of the high seating thrust against the stem, and the resilient means therein disclosed for seating the plug is not satisfactory for high pressure service. In this valve the threaded operating stem for turning the plug forms a tongue and groove connection therewith.

According to the present invention, I provide a valve in which the operating stem has a sealing surface bearing on a complementary sealing surface on the casing, and lubricant is introduced between said sealing surfaces to prevent leakage, a secondary seal of suitable packing material being provided about the stem to prevent or retard escape of lubricant. The packing forming the secondary seal thus is removed from the effect of line fluid, and as lubricant is ahead of any line fluid tending to escape, the secondary packing need only prevent escape of lubricant which is easier to hold than the line fluid. Further, the lubricant supplied to the stem and casing sealing surfaces is introduced between the packing and stem and thereby serves to lubricate the packing and assist in its sealing function. The lubricant seal formed between the sealing surfaces of the stem and casing is independent of the secondary sealing means, and each may be renewed independently of the other while the valve is in service. The packing material preferably employed for this purpose is fibrous and is sufficiently plastic so that it may be forced through a check valve to the stem, the check valve providing against reflux of packing so that the packing may be renewed while the valve is in service, and suitable means is provided for compressing the packing. The sealing surfaces preferably are laterally extending and may take the form of co-operating tapered surfaces, a flange on the stem co-operating with a plane surface on the casing, or a running thread or the like on the stem and casing, and the secondary seal may be located around a smooth part of the operating stem, or may surround a threaded portion thereof, lubricant being applied to the threads or other sealing surfaces at their inner ends or intermediate the ends of the stem by means of a chamber suitably located.

The invention is particularly applicable to plug valves in which the plug is jacked from its seat to permit easy turning thereof, and as the operating stem is separate from the plug and at the smaller end thereof, the secondary packing seal about the stem does not oppose or interfere with the lifting of the plug from its seat. Further, the outward thrust exerted by line pressure on the stem is not transmitted to the plug, and the lubricant applied between the sealing surfaces of the plug and casing assists in reducing the friction therebetween. In this construction the same chamber that supplies lubricant to the sealing surfaces may be employed to jack the plug from its seat, or separate mechanical or hydraulic plug jacking means may be provided.

In the specific preferred embodiment of my invention I provide a tapered plug valve in which an operating stem separate from the plug is threaded through the casing and lubricant under pressure is applied to the threads from a lubricant chamber located adjacent the end of the stem to provide a seal against leakage, a secondary seal of packing material being applied to a packing chamber around an outer portion of the threaded stem to retard or prevent outward escape of lubricant. The lubricant thus supplied to the lubricant chamber serves the purpose of lubricating and sealing the threads and packing, jacking the tapered plug from its seat, and supplies lubricant to the lubricant grooves formed in the seating surface of the plug and casing.

Accordingly, it is an object of the present invention to provide a valve having an operating stem with a sealing surface thereon co-operating with a complementary shaped sealing surface on the valve casing with means for applying lubricant to the sealing surfaces, and a secondary packing to prevent leakage therethrough to the exterior.

Another object of the present invention is the provision of a plug valve having an operating stem separate from the plug with a sealing surface co-operating with a complementary shaped sealing surface on the valve casing, and having means for introducing viscous lubricant between the sealing surfaces to prevent leakage therethrough, and facilitate turning of the valve, the plug being resiliently and adjustably held on its seat.

A further object of this invention is the provision of a plug valve having an operating stem with a sealing surface thereon co-operating with a complementary shaped sealing surface on the valve casing, means being provided for introducing viscous lubricant under pressure to the sealing surfaces to prevent leakage therethrough to the exterior and facilitate turning of the operating stem, and for lubricating the valve plug seating surfaces and jacking the plug, a secondary packing being provided to prevent leakage of lubricant around the stem.

A further object is the provision of a plug valve in which the valve stem may be repacked while the valve is operating on high pressure service without taking the valve out of service.

A further object is the provision of a plug valve in which the valve stem sealing and packing means is separate from the resilient means for holding the plug on its seat, the plug seating means having relatively permanent resiliency, and the sealing and packing means for the stem being capable of renewal without disturbing adjustment of the plug seating means.

Still a further object of the invention is the provision in a plug valve of an operating stem separate from the plug member with means for sealing the stem against leakage, and a resilient cover adjustably bearing on the plug through an anti-friction thrust bearing, means being provided to seal the adjustment.

Among other objects of my invention is the provision of a valve in the larger sizes intended for high pressures which is compact in construction, has few parts, is relatively very easy to operate, and requires infrequent attention or adjustment.

In order that the invention may be more clearly understood, an embodiment of the improved valve will be described in greater detail by way of example with reference to the accompanying drawings wherein:

Figure 1 is a vertical sectional view of a preferred embodiment of my invention;

Figure 2 is a view partly in vertical section of the secondary stem sealing means looking in the direction of arrow II in Figure 1;

Figure 3 is a plan view of the equalizer;

Figure 4 is a fragmentary sectional view looking in the direction of arrow II in Figure 1 showing the plug, stem and equalizer in assembled position;

Figure 5 is a horizontal section taken on line V—V of Figure 2;

Figure 11 is a sectional view showing a further modified stem sealing arrangement, Figure 12 is a vertical sectional view of a modification having gearing for operating the valve.

Figure 6:
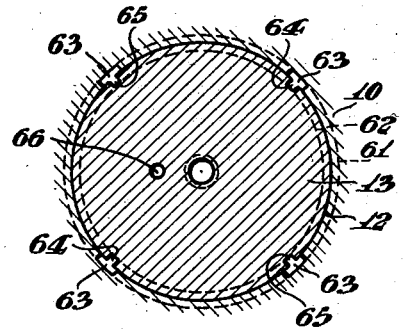
Figure 6 is a section taken on line VI—VI of Figure 1.

Referring to the drawings, Figure 1, the invention comprises a body or casing 10 provided with a passageway 11 therethrough for flow of line fluid. A tapered bore 12 which forms a tapered or conical seat is formed in the casing transversely of the passageway 11, and a frusto conical plug 13 provided with a hole or port 14 therethrough which is adapted to register with passageway 11 in open position is seated in said seat. A lubricant chamber 16 is provided at the smaller end of the plug, and the larger end of the seat is closed by a metal cover plate 18 of cast or forged steel held in place at its margin by studs or bolts 19 and providing a chamber 17 between the cover and larger end of the plug.

The casing is extended at the smaller end of the seat and has a threaded hole 22 bored and tapped therethrough extending from the exterior to the chamber 16. An operating stem 20 squared at its outer end has a threaded portion 23 extending through said bore, and at the inner end of the stem there is a tongue or extension 24, the purpose of which will hereinafter appear. The threaded portion 23 of the stem 20 has an accurately machined running thread which co-operates with similar threads in the wall of hole 22 in the casing, and a very close fit between the threads therefore is provided.

The tapered plug 13 as shown forms one wall of chamber 16 and extends partly into this chamber, and a tongue 27 (Figures 1 and 4) is integrally formed at its smaller end. An equalizer 30 has a correspondingly shaped lateral groove 31 formed diametrically therethrough and is adapted to rest on the smaller end of the plug with the tongue 27 projecting into the groove 31 thereof. A hole 32 of generally rectangular shape is formed axially through the equalizer, and in assembled position the tongue 24 of the stem projects into the hole 32 in the equalizer, and a sufficient clearance is provided in hole 32 and groove 31 so that there is a small amount of play at these points. A collar 21 is secured to the squared end of the stem 20 and is held in place by any suitable means, such as set screw 25. A stop 26 depends from collar 21 and co-operates with stop members 28 and 29 on the casing to limit rotation of the plug to a quarter turn. From the description so far pursued, it will be apparent that the plug 13 can be rotated in its seat by rotation of the operating stem 20, the co-operating threads on the stem and casing advancing the stem into the chamber 16, and sufficient clearance is provided between the stem and the top of the equalizer 30 to provide for this movement without exerting any thrust on the plug.

A suitable internal step 34 is formed in the casing adjacent the larger end of the seat, and a diaphragm designated generally by the numeral 35 is located thereon and is clamped between the cover 18 and shoulder 34, a suitable gasket being employed to provide a tight joint. The diaphragm 35 may be single, but preferably is composed of two disks, the internal disk 35' being preferably a non-corrosive alloy such as stainless steel, the other or external diaphragm 35'' being composed of carbon steel. The plug 13 has a conical recess 36 in its large end in which is located a steel thrust ball 37, and a thrust disk 38 having a suitable recess therein is located between the ball 37 and diaphragm 35 and is adapted to bear on the ball. The cover 18 has a threaded bore 39 therein adapted to receive the threaded adjusting screw 41, and a counterbore 42 in the cover receives a second thrust disk 43 and provides a shoulder 44 to limit outward movement thereof. The cover 18 is formed as a steel forging or steel casting to obtain sufficient strength and resiliency therein, and bears on the plug through the intermediary of adjusting screw 41, disk 43, diaphragm 35, disk 38 and ball 37. The seating pressure on the plug in its seat is adjusted by turning inwardly the threaded plug 41 which tends to bow the cover outwardly and thereby exerts a reacting thrust through the diaphragm 35 and thrust disks 43 and 38 which is transmitted by ball 36 to the plug. Turning the threaded plug 41 inwardly increases the seating pressure of the resilient cover 18, and turning the threaded plug outwardly relieves the pressure.

The threads on stem 23 co-operate with the threads on the hole 22 to form sealing surfaces which are sealed against escape of line fluid or pressure by means of a suitable viscous lubricant supplied thereto from chamber 16. Lubricant is introduced into chamber 16 through the operating stem 20 which has a threaded bore 46 extending therethrough in which is located a suitable check valve fitting (not shown) to prevent reflux of lubricant. A threaded screw 47 is located in this bore. The threaded bore is filled with lubricant which is introduced in the form of a stick, and is pushed by the screw 47 through the check valve into the chamber 16. Because of the close fit between the threads 23 on the operating stem and in the hole 22, which form sealing surfaces, the outward flow of viscous lubricant from the chamber 16 is resisted so that the lubricant between these threads forms a primary seal. I provide a secondary seal comprising a packing chamber 55 containing packing 56 under pressure around the stem to prevent outward escape of lubricant, and the lubricant which works its way out along the stem assists in lubricating and sealing the packing. Any suitable fibrous packing material can be used for this purpose, such as a stiff mixture of lubricant, graphite and asbestos, or the like. Packing is supplied to the packing chamber 55 through an opening 56' extending through a lug 57 on the side of the casing, and a check valve fitting 58 is threaded into the passage 56' and carries a spring pressed ball check valve 59 to prevent refluxing of packing therefrom. The packing in chamber 55 can be compressed by means of the threaded plunger 60 threaded into a hole 60' in the check valve fitting 58, and made to conform closely to the threaded stem 23, thereby increasing the resistance to escape of lubricant along the threads.

Figure 7:
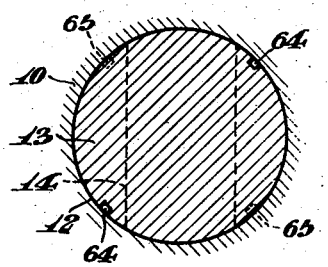
Figure 7 is a section taken on line VII—VII of Figure 1.

Sufficient pressure can be generated with the screw 47 so that the pressure of the lubricant in chamber 16 will jack the plug 13 slightly off its seat against the opposing thrust of the resilient cover 18. Also lubricant is supplied from the chamber 16 through suitable grooves to the seating surface of the plug and casing to provide a substantially complete seal around the passageway 11 through the casing in fully open and closed positions. An annular recess 61 is provided in the seat adjacent its larger end, and a similar annular recess 62 directly opposite the former may be provided in the plug to enable proper lapping of the plug in its seat. A series of four dwarf connecting grooves 63 (Figures 1 and 6) is provided in the seating surface of the casing and in fully open and closed position these dwarf grooves are adapted to connect with the longitudinal grooves 64 and 65 in the plug surface. Two such pairs of longitudinal grooves are provided, the grooves 64 being diametrically opposite and extending substantially the full length of the space between the chamber 16 and the dwarf grooves 63 (Figures 6 and 7) and the pair of diametrically opposite shorter grooves 65 being connected or overlapped with the dwarf grooves 63 but terminating at the smaller end of the plug just short of the lubricant chamber 16.

Figure 8:
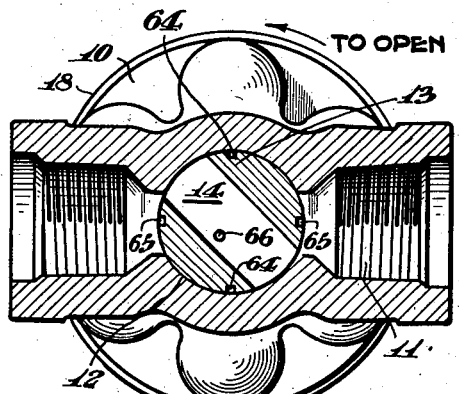
Figure 8 is a sectional view on a reduced scale taken through the center of the valve on line VIII—VIII of Figure 1, the plug being turned 45°.

The valve is opened by turning the plug and stem counterclockwise as shown in Figure 8. In the position shown in Figure 1 the valve is closed and there is substantially a complete seal around the passageway 11 at each end of the valve formed by the lubricant chamber 16 at the smaller end, the short groove 65 and connecting groove 63 on one side, the opposite disposed circumferential grooves 61 and 62 at the larger end, and the long groove 64 and dwarf groove 63 on the other side. The lubricant chamber 16 is spaced a suitable distance from the passageway 11 so that it may serve also as a circumferential lubricant groove, the plug being made short enough for this purpose. In passing from closed to open position the grooves 65 are exposed to line fluid, as shown in Figure 8, and it will be seen by reference to Figure 6 that they are disconnected from the dwarf grooves 63 at such times so that lubricant under pressure in the system will not escape therefrom. Further, it will be seen by reference to Figure 8 that the grooves 65 are so disposed that they are not subjected to direct impingement of line fluid passing through the valve in partly open position.

An opening 66 may be provided connecting the port 14 with the chamber 17 at the large end of the plug to prevent the trapping of incompressible lubricant or line fluid therein which would interfere with the jacking of the plug from its seat. This hole or duct 66 permits escape of incompressible fluid from the chamber 17 when the plug is jacked from its seat by lubricant pressure, and may be omitted under certain conditions.

The operation of the valve now will be described. The valve being in assembled open position, one or more sticks of lubricant are introduced into the threaded bore 46 in the stem and are forced by means of the threaded screw 47 into the lubricant chamber 16 until this chamber is filled. As the lubricant grooves 64 in the plug surface communicate with the chamber 16 these grooves as well as the circumferential grooves 61 and 62, dwarf grooves 63, and the short longitudinal grooves 65 will become filled with lubricant, and the lubricant which finds its way between the threads 23 and 22 seals the operating stem and eliminates binding thereof. The threaded screw plug 41 is adjusted to develop the proper seating thrust of the cover against the plug, and the pressure of packing 56 in the chamber 55 is adjusted by threading inwardly the plunger 60 to the desired extent to permit easy turning of the valve and prevent escape of lubricant from between the threads. Sufficient pressure can be generated on the lubricant in chamber 16 by means of screw 47 to jack the plug from its seat when required.

As shown in Figure 1 the valve is in closed position. In order to open the valve the stem is turned counterclockwise, and the thrust of the tongue 24 against the walls of the groove 32 in equalizer 30 is transmitted by the tongue and groove connection 27 and 31 to the plug, the turning force being automatically centered and balanced by the equalizer. In turning the plug, the grooves 65 are disconnected from the source of lubricant pressure by reason of their separation from the connecting dwarf grooves 63, when they are exposed to line fluid, and it is not possible for line fluid to wash lubricant out of any part of the lubricant system other than the grooves 65. Further, it will be noted that the grooves 65 are not directly impinged by line fluid passing through the restricted port in the plug, so that the tendency for line fluid to wash lubricant therefrom is greatly reduced. In the full open position the passageway 11 is surrounded by a substantially complete seal in substantially the same way as in the full closed position. When it becomes necessary to renew the packing 56 in the chamber 55, the threaded plunger 60 is removed, the threaded bore 60' is filled with a charge of packing, and the threaded plunger 60 reinserted to compress the same. The plunger forces the packing past the ball check valve 59 into the packing chamber 55. It will be seen that with this arrangement the valve can be repacked even when it is under pressure because the ball check valve 59 prevents the escape of lubricant, packing or line fluid through the check valve fitting 58.

Figure 10:
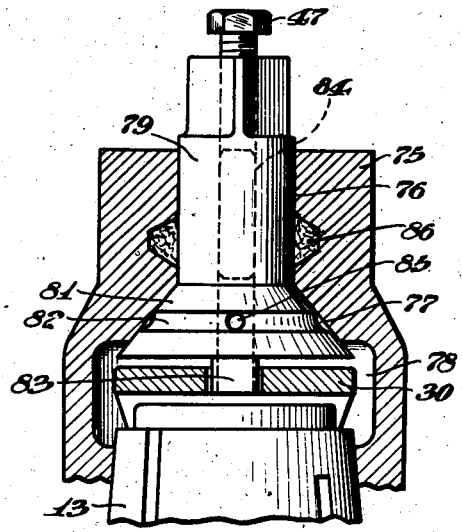
Figure 10 is a sectional view showing a modified stem sealing arrangement.
Figure 9:
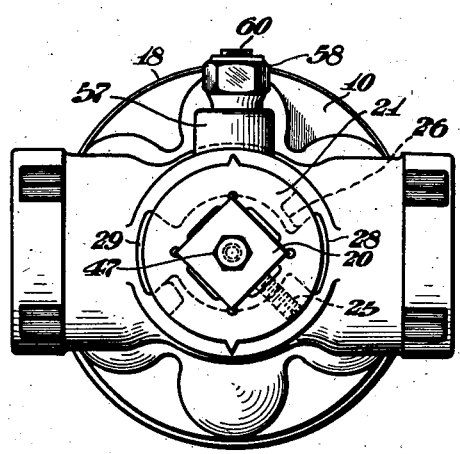
Figure 9 is a plan view of Figure 1.

In Figure 10 there is shown a further modification of my improved stem sealing means. In this modification the valve casing 75 has a plug 13 therein as previously described, and has a smooth bore 76 extending through the casing and terminating in a conical seat 77 adjacent the lubricant chamber 78. An operating stem 79 extends through the bore and at its lower end carries an integral conical section 81 adapted to seat against the conical seat 77. A circumferential groove 82 may be cut or formed in the conical portion 81 of the stem if desired. The taper of the co-operating stem and casing may be a non-locking taper if desired to reduce resistance to turning of the operating stem. The stem has a non-circular extension 83 which co-operates with the equalizer 30 previously described whereby the plug is rotated upon rotation of the stem. The hole 84 through the stem communicates with the lubricant chamber 78, and may connect with the circumferential groove 82 through a suitable radial hole 85 passing through the stem whereby lubricant is distributed over the co-operating tapered sealing surfaces of the stem and casing. If desired, the lubricant duct 85 may be omitted, in which case the circumferential groove 82 will collect lubricant supplied between the surfaces from the lubricant chamber 78 which provides a primary seal for the operating stem and casing. Packing is supplied to the packing chamber 86 about the stem through a suitable opening provided in the casing (not shown) similar to that shown in Figure 2, and the packing in chamber 86 provides a secondary seal about the stem to prevent the outward escape of lubricant.

In operation, the tapered portion 81 of the stem is held seated against the casing by line and lubricant pressure, and co-operates with the casing to form primary sealing surfaces which are sealed by lubricant introduced therebetween by lubricant screw 47. Lubricant also is supplied to the lubricant chamber 78 for sealing these surfaces and lubricating and jacking the plug 13. The packing in chamber 86 can be compressed closely against the smooth plug stem 79 so as to prevent escape of lubricant which will be in advance of line fluid.

In Figure 11 I have shown a further modification of my improved stem sealing means. In this modification, the casing 160 has a plug 13 therein as previously described, and has a smooth bore 161 therein through which extends the operating stem 170. This stem is cylindrical and at its lower end carries an integral flange 171. The bore 161 is counterbored at 172 to receive a suitable gasket 173, and the flange 171 is adapted to bear against this gasket to provide a sealing surface therewith. This surface is sealed by lubricant in chamber 174 which is introduced through a threaded bore 175 in the stem by a threaded screw 47. The casing is counterbored on its outside to provide a packing recess 177 within which the packing 178 is compressed by a gland 179 bolted or otherwise adjustably secured to the casing.

The equalizer 30 connects the plug 13 with a non-circular projection 181 extending from the operating stem whereby an operative connection is established between the stem and the plug. Any suitable check valve may be employed in the threaded bore 175 to prevent reflux of lubricant therefrom.

In operation, the sealing surface formed between the flange 171 and the gasket 172 is lubricated and sealed by lubricant supplied to chamber 174, and the packing 178 provides a secondary seal to prevent escape of lubricant along the operating stem. Because the lubricant pressure on the flange 171 is unbalanced, the tendency of the lubricant pressure will be to force the flange into more intimate contact with the gasket and thereby assist sealing of the stem. The secondary seal 178 therefore need only be compressed sufficiently to prevent escape of lubricant between the stem and casing and does not materially increase the resistance to operation of the valve.

Figure 13:
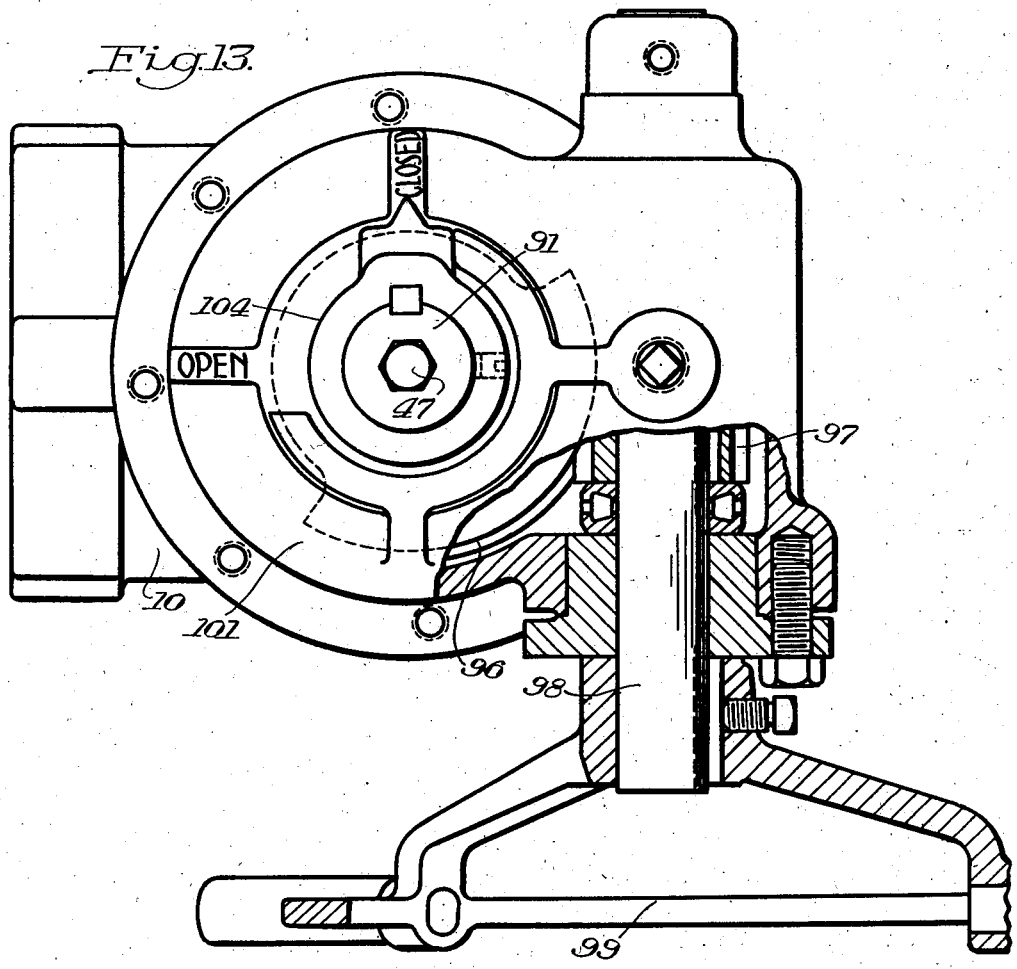
Figure 13 is a plan view of Figure 12 with certain parts in section.
Figure 14:
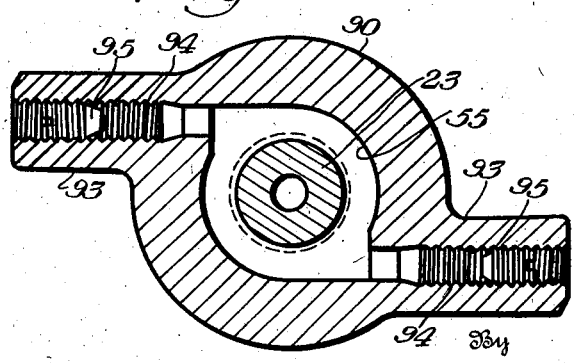
Figure 14 is a section taken on line XIV—XIV of Figure 12.

In the modification shown in Figures 12 to 14, wherein like parts are correspondingly numbered, the casing 10 has an extension 90 at the smaller end and has a threaded bore 22 therein which receives the operating stem 91 having a threaded portion 23 adjacent its lower end. The tongue 24 of the stem extends into a recess 92 in the small end of the plug, the fit being loose enough to provide for a slight play or lost motion between the stem and plug. The packing recess 55 surrounding the threaded stem is adapted to receive a suitable plastic packing as hereinbefore described. Extension 90 of the casing has one or more lugs 93 which are bored at 94 to communicate with the packing recess 55, the bores 94 preferably being tangential to the packing recess 55. Threaded screws or pistons 95 are received in the threaded bores 94 and it will be apparent that when the bores 94 and recess 55 are filled with plastic packing, the packing may be compressed by threading inwardly the plugs or pistons 95. Pistons 95 may have a countersunk non-circular hole or may be provided with kerfs to enable them to be turned.

The operating stem 91 is adapted to be rotated between open or closed positions by the segmental worm gear 96 secured to the operating stem 91 and co-operating worm 97 secured on shaft 98, the latter shaft being rotatable by a hand wheel 99 secured thereto, or by other suitable means. The extension 90 of the casing has a flange 100 thereon to which is secured a casing 101, a gasket being interposed to prevent leakage, and casing 101 houses the gearing mechanism for operating the plug.

Lubricant is supplied to the valve through the stem 91 which has a threaded bore 102 drilled through in which is located a screw for developing lubricant pressure. Suitable ball check valve fittings 103 in the bore 102 prevent escape of lubricant or line fluid when the screw is removed for relubrication. The hole 102 extends the whole way through the stem so as to provide communication through recess 92 with the lubricant chamber 16 at the small end of the plug. As the particular lubricant groove system shown in this modification is described and claimed in my application Serial No. 691,213, filed September 27, 1933, it will not be described herein.

An indicator element 104 is secured to the outer end of valve stem 91 and has an index thereon which indicates the open and closed positions of the valve plug and the direction of flow of fluid through the passage 11. Indicator element 104 is secured to the outer end of the valve stem preferably by a set screw 105, to permit adjustment thereof, the shoulder of the indicator element being spaced slightly from the housing 101 so that it will not be jammed against the housing when the stem moves axially as the valve is turned in operation. The valve is adapted to be operated by rotation of the operating wheel 99 which rotates worm 97 coacting with segmental worm gear 96 keyed to the stem 91. As the fit between the threads 22 and 23 is very close, a considerable initial resistance against turning the stem may be encountered. The fit between the tongue 24 of the stem and the recess 92 in the plug provides for the necessary manufacturing tolerances and additional clearance for lost motion may be provided in order that the resistance to initially turning stem 91 can be overcome before the resistance of valve plug 13 to turning is encountered. Also, as rotation of stem 93 advances the stem into the recess 16 in turning the valve from open to closed position the play between the extension 24 and recess 92 permits a slight building up of pressure in the chamber 16 to jack the plug from its seat before a turning torque is applied to the plug. There is sufficient clearance between the plug and end 24 of the stem so as to avoid interference therebetween due to the axial movement of the stem.

The invention may be embodied in other specific forms without department from the spirit or essential characteristics thereof. The present embodiment is therefore to be considered in all respects as illustrative and not restrictive.

What is claimed and desired to be secured by United States Letters Patent is:

1. In a valve, a valve casing having a passageway therethrough, a valve member in said casing for controlling flow through said passageway, a separate operating stem for said valve member passing through said casing having a laterally extending sealing surface interfitting with a complementary sealing surface on the casing, means for supplying lubricant between said surfaces, and a secondary seal of packing material about said stem forming part of said complementary seating surface on the casing to prevent outward escape of lubricant from between said surfaces.

2. In a valve, a valve casing having a passageway therethrough, a valve member in said casing for controlling flow through said passageway, a separate operating stem for said valve member passing through said casing having a laterally extending sealing surface interfitting with a complementary sealing surface on the casing, a secondary seal of packing material about said stem adjacent its outer end, and means for supplying lubricant under pressure to lubricate and seal said sealing surfaces and packing.

3. A valve comprising a valve casing having a passageway therethrough, a valve member in said casing for controlling flow through said passageway, separate means for operating said valve member passing through said casing, a sealing surface on said operating means co-operating with a complementary sealing surface, means to supply lubricant under pressure at one point of contact of said sealing surfaces, and means to apply an independent pressure to a section of said complementary sealing surface spaced from said point of supply in a direction toward the outside of said casing.

4. A valve comprising a valve casing having a passageway therethrough, a valve member in said casing for controlling flow through said passageway, separate means for operating said valve member passing through said casing, a sealing surface on said operating means co-operating with a complementary sealing surface, a portion of said complementary surface being formed of a flowable material, means to supply lubricant under pressure at one point of contact of said sealing surfaces, and means to apply an independent pressure to said flowable material to prevent escape of lubricant from between said sealing surfaces.

5. In a valve, a valve casing having a passageway therethrough, a valve member in said casing for controlling flow through said passageway, a separate operating stem for said valve member having a threaded portion engaging a correspondingly threaded portion on said casing means for supplying lubricant between said threads, and a secondary seal of packing material about said stem engaging the threads thereon to prevent outward escape of lubricant from between said threads.

6. In a valve, a valve casing having a passageway therethrough, a valve member in said casing for controlling flow through said passageway, a separate operating stem for said valve member having a threaded portion engaging a correspondingly threaded portion on said casing, means for supplying lubricant between said threads, a secondary seal of packing material about said stem engaging the threads thereon to prevent outward escape of lubricant from between said threads, and means for adjusting the pressure on the packing material forming said seal.

7. In a plug valve, a casing having a passageway therethrough and a tapered valve seat formed transversely of the passageway, a tapered plug seated in said seat and having a port therethrough adapted to register with the passageway, a separate operating stem for said plug engaging the smaller end thereof and having a threaded sealing surface coacting with a correspondingly threaded sealing surface on said casing, packing surrounding said operating stem adjacent its outer end, and a common lubricant chamber for jacking said plug from its seat and supplying lubricant under pressure to said threads and said packing.

8. In a valve, a valve casing having a passageway therethrough, a valve member in said casing for controlling flow through said passageway, a separate operating stem for said valve member passing through said casing having a laterally extending sealing surface interfitting with a complementary sealing surface on the casing, a closed chamber providing a secondary seal of packing material about said stem adjacent its outer end, means for introducing packing under pressure into said chamber, and means for supplying lubricant under pressure to lubricate and seal said sealing surfaces and packing.

SVEN J. NORDSTROM.